(12) United States Patent
Puri et al.

(10) Patent No.: US 7,024,869 B2
(45) Date of Patent: Apr. 11, 2006

(54) ADDITION OF ODORANTS TO HYDROGEN BY INCORPORATING ODORANTS WITH HYDROGEN STORAGE MATERIALS

(75) Inventors: Pushpinder Singh Puri, Emmaus, PA (US); Guido Peter Pez, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 10/321,326

(22) Filed: Dec. 16, 2002

(65) Prior Publication Data

US 2004/0126889 A1  Jul. 1, 2004

(51) Int. Cl.
*F17C 11/00* (2006.01)
(52) U.S. Cl. .......................................... 62/46.1; 48/195
(58) Field of Classification Search ................. 48/195; 62/46.1, 46.3; 44/468, 458
See application file for complete search history.

(56) References Cited

U.S. PATENT DOCUMENTS

| | | | |
|---|---|---|---|
| 3,907,515 A | * | 9/1975 | Mulliner et al. .................. 44/2 |
| 6,063,632 A | | 5/2000 | Perkins .......................... 436/3 |
| 6,481,217 B1 | * | 11/2002 | Okazaki et al. ............... 62/46.1 |
| 6,672,077 B1 | * | 1/2004 | Bradley et al. |

FOREIGN PATENT DOCUMENTS

WO   0011120   2/2000

OTHER PUBLICATIONS

Proc. U.S. DOE Hydrogen Program Rev. (1996), vol. 2, pp. 569-604.
M. J. Usher (*Proc. Int. Scho. Hydrocarbon Meas.* $73^{rd}$, pp. 743-748 (1998).
I. Katuran (*Proc. Int. Sch. Hydrocarbon Meas.*, $64^{th}$, pp. 325-330 (1989).
Paul F. Zeck, (DO53017A), *Design of an Electronic Odorant Injection System*, pp. 720-726.

\* cited by examiner

Primary Examiner—Harry B. Tanner
(74) Attorney, Agent, or Firm—Keith D. Gourley

(57) ABSTRACT

An apparatus for dispensing an odorant to a hydrogen gas includes at least one container, each container having an interior volume. At least one odorant material is disposed in the interior volume of a first container, the odorant material having at least one detectable odor. At least one hydrogen storage material is disposed in the interior volume of the first container or the interior volume of a second container.

23 Claims, 1 Drawing Sheet

ADDITION OF ODORANTS TO HYDROGEN BY INCORPORATING ODORANTS WITH HYDROGEN STORAGE MATERIALS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to fluid leak detection, and in particular to the leak detection of gases by odor generated by adding odiferous materials to the gases.

With the advent of the fuel cell technology and a drive for clean fuel, hydrogen gas is emerging as a leading candidate for the fuel of choice. In addition to the benefit of being clean burning, hydrogen may be obtained from an abundant, renewable, resource, water.

For hydrogen to become a consumer fuel for automobile and domestic power generation, safety is paramount. Although safe handling and use of hydrogen is well understood, warnings are needed to alert against any leaks. Hydrogen sensors are commercially available but are not considered to be an absolute safeguard against leaks due to their potential for malfunctioning, flow sweeps, etc. Human senses, in particular, the sense of smell, are considered to be the ultimate safeguard against leaks. Since hydrogen is an odorless gas, odorants are preferably incorporated in hydrogen for easy leak detection. A review of the codes, standards, regulations, recommendations, and certifications on the safety of gaseous fuels is addressed in a report, Proc. U.S. DOE Hydrogen Program Rev. (1996), Vol.2, pages 569–604.

Odorization of gases for leak detection is well known in the natural gas and petroleum gas industries. For example, a paper by M. J. Usher (*Proc. Int Scho. Hydrocarbon Meas.* $73^{rd}$, pages 743–48 (1998)) reviews the history, application, compounds, and safety practices in selecting and applying odorants in the natural gas industry. Mixing small quantities of odorants with gases is a substantially universal practice in natural and petroleum gases. For example, a paper by I. Katuran (*Proc. Int. Sch. Hydrocarbon Meas.*, $64^{th}$, pages 325–30 (1989)) reports on natural gas odorants, their safety and handling precautions, handling techniques, and methods of adding odorants to gases.

Nearly all of the methods for odorization of natural and petroleum gases consist of metering a certain amount of the odorant into a gas stream to a level where detection can be made by the human sense of smell. Natural gas for public gas supplies typically contains 5–10 mg of sulfur per cubic meter of gas. However, odorants for hydrogen used as an energy source for fuel cells have unique requirements which must be met. This is because most of the commercial odorants used in gas leak detection act as poisons for the catalysts used in hydrogen based fuel cells, most specifically for the PEM (polymer electrolyte membrane or proton exchange membrane) fuel cells. Chemical compounds based on mixtures of acrylic acid and nitrogen compounds have been adopted to achieve a sulfur-free odorization of a gas. See, for example, WO 00/11120 (PCT/EP99/05639) by Haarmann & Reimer GmbH. However, these formulations are either ineffective or do not have general acceptance by users. Also, in the use of natural gas and other petroleum gases for hydrogen generation for fuel cell applications, sulfur free natural or petroleum gases are needed, or else a desulfurization step must be incorporated in the reforming process, which adds further cost to hydrogen generation.

The PEM fuel cells are sulfur intolerant because sulfur compounds poison the noble metal catalysts used in these fuel cells. If sulfur-containing odorants are used, it would be necessary to remove sulfur containing materials, like mercaptan odorants, from the feed gas using materials like zinc oxide. The sulfur containing materials, like thiophenes, cannot be removed by zinc oxide and may require a hydrodesulfurization process, using hydrogen gas, to remove sulfur. This all will add to the cost of the process.

A further complexity for hydrogen fuel comes from the nature of the hydrogen flame propagation. When gases burn in air, their flames propagate upwards with greater ease than they propagate downwards. This is primarily due to the natural convection of hot burnt gases in an upward direction. For petroleum gases, propane and methane, the upward and downward propagating lean limits of combustion are approximately the same. However, for hydrogen, since they differ by a factor of 2.5, the amount of odorant needed for leak detection in hydrogen could be >2.5 times that needed for methane or propane. The higher quantity of the odorant needed for hydrogen odor detection further complicates the sulfur poisoning problems for hydrogen gas used in the PEM fuel cells.

In several other gas applications, particularly when gases are odorless, toxic, or are otherwise harmful, methods of leak detection using odiferous materials are also desirable. The gases included in this category are, for example, nitrogen, carbon monoxide, nitrogen trifluoride, ethylene oxide, carbon tetrafluoride and other perfluoro gases.

Several other issues also have been encountered in the odorization of the natural and petroleum gases. The key ones are (1) hydrocarbon masking the odor of the odiferous materials, (2) adsorption of the odorant on the storage vessel and pipe walls, (3) reaction of the odorants with low molecular weight mercaptans (naturally occurring in the gas), (4) condensation of the odorants in the gas storage vessel and pipes, and (5) physical scrubbing of the mercaptans from the gas with liquids (associated with the natural gas).

Today, approximately twenty-five different blends are used as natural gas odorants. Of these twenty-five blends, seven blends are more prevalent. Almost all of the odorant agents are sulfur compounds, e.g., mercaptans (tetrabutyl mercaptan, isopropyl mercaptan, normal propyl mercaptan, secondary butyl mercaptans, ethyl mercaptans, normal butyl mercaptan, etc.), thiophenes (tetrahydrothiophene), sulfides (dimethyl sulfide, methyl ethyl sulfide), etc.

In addition to the pungent odors of these chemicals, the chemicals used are also expected to have certain other attributes, such as low vapor pressure (high boiling point), low freezing point, low specific gravity so that they are fully dispersed in the gas, and appropriate thermal properties (e.g., they will not freeze at appropriate temperatures and will not cause over odorization in the hot weather). The general quality requirements, as specified for sulfur containing odorants in ISO/DIS 13734, are: (1) a cloud point of less than −30 degrees Celsius, (2) a boiling point of less than 130 degrees Celsius, and (3) evaporation residue of less than 0.2%.

Requirements for odorants further will likely include an odorant concentration high enough to allow detection with a fuel gas concentration of $\frac{1}{5}$ the lean limit of combustion.

These requirements exist for natural gas (SAE J 1616, NFPA 52-1992) and petroleum gas (NFPA 58-1989).

Natural gases are generally stored, distributed and used at relatively low pressures (50–500 psi). Hydrogen gas on the other hand is stored and transported at very elevated pressures (up to 10,000 psi). At normal operating temperatures, the odorants added to the high pressure gas storage tend to condense at the bottom of the storage vessels. This results in a non-uniform distribution and release of the odorants with the gas, causing a risk of over and under odorization, thereby taking the reliability away from the leak detection method by the human senses.

A traditional method of using odorants is to meter a predetermined amount of the odorant into the gas stream either continuously in the pipeline or on a batch basis in the storage tanks. Electronic odorant injection systems (refer Zeck, DO53017A) have been designed that inject a prescribed amount of the odorants into the gas stream proportional to its flow rate. An electronic odorization system has five duties that it must perform to provide a safe source of natural gas. Combined, these duties insure that enough odorant is injected to make the gas properly detectable to human beings. These duties include:

1) to inject the proper amount of odorant in proportion to the flow of the natural gas;
2) to properly verify system operation;
3) to provide an alarm upon system malfunction;
4) to display information regarding system performance; and
5) to provide chronological records regarding all aspects of the system performance.

The typical full-featured electronic delivery odorant system should incorporate the following major components:

1) an injection pump;
2) an odorant meter/totalizer; and
3) a system electronics/controller.

Dispensing of the odorants may be done either in the gas tank or in the gas delivery pipes. Since the odorants are added to the bulk gas, their concentration varies throughout the tank. The odorant concentration in the delivered gas also is dependent on the speed at which the gas is dispensed. At low dispensing speeds, odorants get adsorbed on the delivery pipe walls, resulting in low odorant concentration in the bulk gas.

Whereas adding odorants in the bulk gas is a simple method, it requires the whole gas stream to be contaminated and reasonably large quantities of the odorants have to be used. Odorants tend to condense in high pressure and low temperature storage and phase separate from the gas, thereby causing a gradient of the odorants in the gas.

Thus, the whole process of dispensing odorants to the gas and maintaining a uniform concentration of odorant in the gas is complex and requires major improvements.

It is, therefore, desired to have the use of odorants in hydrogen gas storage and delivery systems in which the odorants are released in the gas in such a manner that a uniform quantity of the odorants is maintained all of the time.

It is further desired to have the use of odorants in hydrogen gas storage and delivery systems in which the odorants are distributed in the bulk gas in such a way that it maintains an almost constant concentration of the odorant in it throughout the supply of the gas.

It is still further desired to have such a system and method which overcome the difficulties and disadvantages of the prior art to provide better and more advantageous results.

BRIEF SUMMARY OF THE INVENTION

The present invention is an apparatus and a method for dispensing an odorant to a hydrogen gas. There are several embodiments of the apparatus and the method, as discussed below.

A first embodiment of the apparatus for dispensing an odorant to a hydrogen gas includes at least one container, at least one odorant material, and at least one hydrogen storage material. Each container has an interior volume. The at least one odorant material, which has at least one detectable odor, is disposed in the interior volume of a first container. The at least one hydrogen storage material is disposed in the interior volume of the first container or in the interior volume of a second container.

There are several variations of this first embodiment of the apparatus. In one variation, the odorant material and the hydrogen storage material are randomly mixed in the interior volume of the at least one container. In another variation, at least a portion of the odorant material is in a first layer and at least a portion of the hydrogen storage material is in a second layer adjacent the first layer. In yet another variation, the detectable odor is detectable by a sense of smell of a living being.

In another variation of the first embodiment of the apparatus, at least a portion of the odorant material is sorbed on a sorbent. In a variant of that variation, a form of energy is applied to the odorant material and to the hydrogen storage material and/or the at least one container is partially depressurized, thereby releasing an amount of the hydrogen gas from the hydrogen storage material and at least a portion of the odorant material from the sorbent. In a variant of that variant, the portion of the odorant material released is a predetermined quantity.

In another variation of the first embodiment of the apparatus, at least a portion of the odorant material is selected from a group consisting of derivatives of acrylic acid, alkyl esters of $C_4$ to $C_7$, carboxylic acids, and combinations thereof. In yet another variation, at least a portion of the odorant material is encapsulated by a polymer selected from a group consisting of a rubbery polymer, a glassy polymer, and combinations thereof, the rubbery polymer being selected from a group consisting of polydimethyl siloxanes, polyphosphazenes, and combinations thereof, and the glassy polymer being selected from a group consisting of polyimides, polysulfones, polyamides, polyarylates, polyolefins, polyetherketones, polycarbonates, and combinations thereof.

Another embodiment of the apparatus of the present invention is similar to the first embodiment but includes a means for transmitting the hydrogen gas from the at least one container to a storage vessel or an end user. In a variation of this alternate embodiment, the means for transmitting comprises at least one conduit in fluid communication with the at least one container.

In another embodiment of the apparatus for dispensing an odorant to a hydrogen gas, there are multiple elements. The first element is a first container having a first interior volume, and the second element is a second container having a second interior volume. At least one odorant material having at least one detectable odor is disposed in the first interior volume, and at least one hydrogen storage material is disposed in the second interior volume. Another element is at least one conduit having a first end in fluid communication with the first container and a second end in fluid communication with the second container. An additional element is a mixing means in fluid communication with the conduit. The mixing means is adapted to mix a flow of the hydrogen gas transmitted to the second end of the conduit from the second interior volume with a flow of at least a portion of the odorant material transmitted to the first end of the conduit from the first interior volume.

Another embodiment is similar to the last embodiment described above but includes a means for transmitting a mixture of the hydrogen gas and the odorant material from the mixing means to a storage vessel or an end user. In a variation of this embodiment, the means for transmitting comprises at least another conduit in fluid communication with the mixing means.

With regard to the method of the present invention, there also are several embodiments. The first embodiment is a method for dispensing an odorant to a hydrogen gas, which method includes multiple steps. The first step is to provide at least one container, each container having an interior volume. The second step is to provide at least one odorant material sorbed on a sorbent and disposed in the interior volume of a first container, the odorant material having at least one detectable odor. The third step is to provide at least one hydrogen storage material disposed in the interior volume of the first container or the interior volume of a second container. The fourth step is to apply a form of energy to the odorant material and to the hydrogen storage material and/or to partially depressurize the at least one container, thereby releasing an amount of the hydrogen gas from the hydrogen storage material and at least a portion of the odorant material from the sorbent.

There are several variations of the first embodiment of the method. In one variation, the portion of the odorant material released is a predetermined quantity. In another variation, at least a portion of the odorant material is selected from a group consisting of derivatives of acrylic acid, alkyl esters of $C_4$ to $C_7$, carboxylic acids, and combinations thereof. In yet another variation, at least a portion of the odorant material is encapsulated by a polymer selected from a group consisting of a rubbery polymer, a glassy polymer, and combinations thereof, the rubbery polymer being selected from a group consisting of polydimethyl siloxanes, polyphasphazenes, and combinations thereof, and the glassy polymer being selected from a group consisting of polyimides, polysulfones, polyamides, polyarylates, polyolefins, polyetherketones, polycarbonates, and combinations thereof.

Another embodiment of the method is similar to the first embodiment of the method but includes the further step of transmitting the hydrogen gas from the at least one container to a storage vessel or an end user.

Another embodiment of the method for dispensing an odorant to a hydrogen gas includes the following multiple steps. The first step is to provide a first container having a first interior volume. The second step is to provide a second container having a second interior volume. The third step is to provide at least one odorant material disposed in the first interior volume, the odorant material having at least one detectable odor. The fourth step is to provide at least one hydrogen storage material disposed in the second interior volume. The fifth step is to provide at least one conduit having a first end in fluid communication with the first container and a second end in fluid communication with the second container. The sixth step is to transmit a flow of the hydrogen gas to the second end of the conduit from the second interior volume. The seventh step is to transmit a flow of at least a portion of the odorant material to the first end of the conduit from the first interior volume. The eighth step is to withdraw from the conduit at least a portion of the hydrogen gas and at least a portion of the odorant material. The ninth step is to mix the hydrogen gas and the odorant material withdrawn from the conduit, thereby forming a mixture of the hydrogen gas and the odorant material.

There are several variations of the last described embodiment of the method. In one variation, at least a portion of the odorant material is selected from a group consisting of derivatives of acrylic acid, alkyl esters of $C_4$ to $C_7$, carboxylic acids, and combinations thereof. In another variation, at least a portion of the odorant material is encapsulated by a polymer selected from a group consisting of a rubbery polymer, a glassy polymer, and combinations thereof, the rubbery polymer being selected from a group consisting of polydimethyl siloxanes, polyphasphazenes, and combinations thereof, and the glassy polymer being selected from a group consisting of polyimides, polysulfones, polyamides, polyarylates, polyolefins, polyetherketones, polycarbonates, and combinations thereof.

Another embodiment of the method of the present invention is similar to the last embodiment described above but includes the further step of transmitting at least a portion of the mixture of the hydrogen gas and the odorant material to a storage vessel or an end user.

DETAILED DESCRIPTION OF THE INVENTION

Figure 1:
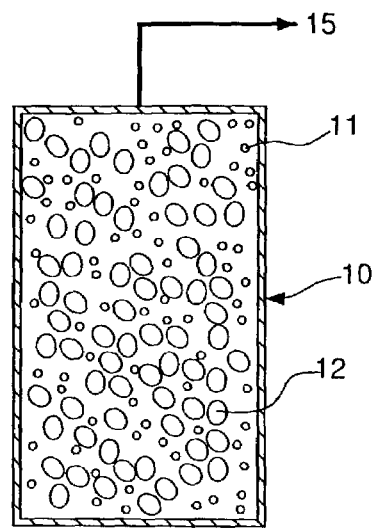
FIG. 1 is a simplified, partial, cross-sectional view of a vessel containing odorant sorbents and hydrogen storage materials in accordance with one embodiment of the present invention.

The present invention is directed to a system and method which can be used for the addition of odorants for use in gas leak detection. An odorant is contained within a sorption medium (sorbent) and is reversibly combined in various ways with a hydrogen storage material where the stored hydrogen is, at a particular temperature and $H_2$ pressure, in equilibrium with $H_2$ gas that is in contact with it. The odorant, reversibly immobilized in a suitable carrier, is used in several different configurations in conjunction with the hydrogen storage material.

In one embodiment of the invention, the solid hydrogen storage material and the solid sorbed odorant are mixed randomly in one vessel or container. In another embodiment, the hydrogen storage material and the sorbed odorant are arranged in discreet layers in the same vessel. In yet another embodiment, the sorbed odorant and the hydrogen storage material are contained in two separate vessels connected to a common gas manifold. In all of these embodiments, when hydrogen is released as required from the hydrogen storage material by heating it and/or by lowering the partial pressure of $H_2$ over the hydrogen storage material, a predetermined amount of odoriferous material is also released as required from the sorbent on which it is sorbed and mixes with the hydrogen, thereby providing the required quantity of the odorant in the hydrogen gas for detection of leaks by odor detection. Thus, depending on the composition and concentration of the odorant on the sorbent, and ultimately on the rate of desorption of the odorant from the sorbent at the temperature and pressure of the contained gas, the gas exiting the vessel containing the hydrogen storage material will have acquired the amount of the odorant that is adequate to give the exiting gas an odor detectable by the human sense of smell.

The hydrogen storage material may be a metal alloy which chemically reacts in a reversible manner with hydrogen to form a metal hydride. Metal hydrides are solids which contain hydrogen in a chemically bound form, from which $H_2$ can be released either by heating or by reducing the partial pressure of the $H_2$ above the solid, or by a combination of the two processes. See G. Sandrock in J. Alloys and Compounds 293–295 (1999) 877–888. Alternatively, the hydrogen storage material may be a composition that is based on carbon, such as carbon nanotubes or carbon-metal hydride compositions. See, for example, EP 1 209119 A2 (2002) by Air Products and Chemicals, Inc.

Any practical hydrogen storage material, be it a metal hydride or a carbon-based composition, functions by having a strong physical or chemical, yet reversible, interaction with the gas. Sulfur containing compounds, which are the most commonly used odorants for natural gas, will likely interfere with this hydrocarbon binding mechanism, thus inhibiting or even precluding the storage of hydrogen. Thus, for the implementation of this invention, non-sulfur containing odorants are highly preferred, including compounds such as the acrylic acid derivatives identified in WO 00/11120, and the butyric, vaoleric, and caporic acid esters that are touted as fuel odorants in JP 2002 060766-A to Nippon Oil Co. Ltd.

In the present invention, the odorant material is sorped or occluded in an appropriate solid medium hydrogen storage material and a predetermined quantity of the sorbed odorant material is mixed with the hydrogen storage materials from which hydrogen is being generated. A key feature of the invention is that it offers a high degree of dispersion of the sorbed odorant through the bed of hydrogen carrying material as well as a large interfacial surface area between the two, such that the solid-occluded odorant is more uniformly delivered from the gas container.

Referring now to the drawings, FIG. 1 shows a simplified, partial cross section of a vessel 10 containing odorant sorbent 11 and particles of hydrogen storage material 12. The hydrogen storage material particles and the particles containing the sorbed odorants are distributed randomly in the vessel 10. When an external source of energy is applied to the vessel 10 and/or there is a partial de-pressurization of the vessel, hydrogen is released from its carrier hydrogen storage material 12 and a predetermined quantity of odorant is released from the odorant sorbent 11. The co-released hydrogen gas and odorant are thus mixed in the sorbent bed vessel and transmitted from this vessel 10 to an outlet 15.

Figure 2:
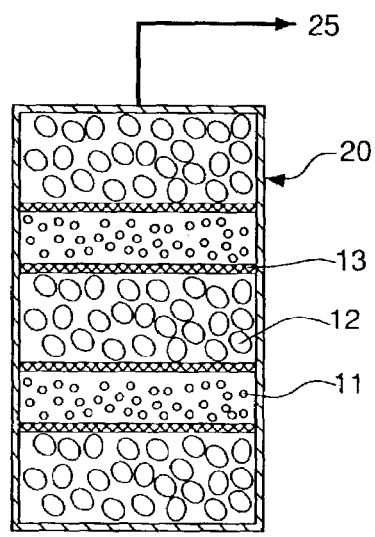
FIG. 2 is a simplified, partial, cross-sectional view of layers of odorant sorbents and adjacent layers of hydrogen storage materials in accordance with another embodiment of the invention.

FIG. 2 shows a simplified, partial cross section of a vessel 20 in which odorant sorbent 11 and the particles of hydrogen storage material 12 are placed in an orderly fashion in layers. A distribution mesh 13 may be used between adjacent layers. When an external source of energy is applied to the vessel 20, hydrogen is released from the hydrogen storage materials 12 and a predetermined quantity of odorant is released from the odorant sorbent 11. The released hydrogen gas and the odorant vapor are mixed in the layered bed and transmitted from the vessel 20 to an outlet 25.

Figure 3:
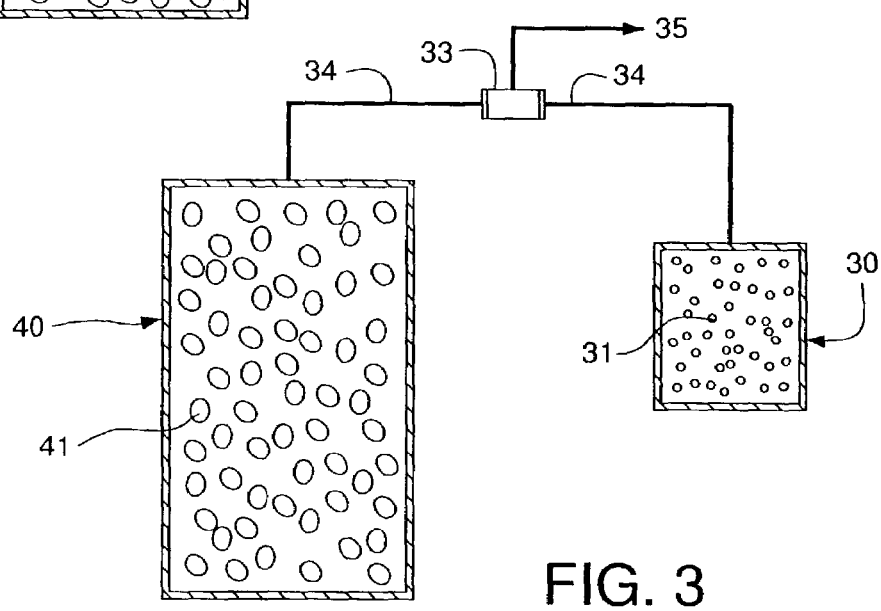
FIG. 3 is a simplified, cross-sectional view of two vessels—one containing odorant sorbents and the other containing hydrogen storage materials in accordance with another embodiment of the present invention.

FIG. 3 shows a simplified, partial cross section of hydrogen storage material containing vessel 40 and an odorant sorbent containing vessel 30. The hydrogen storage material 41 and the odorant sorbent 31 are placed in two separate vessels (30, 40) which may or may not have a common heating source. A common manifold 34 connects the two vessels. When external energy is applied to release hydrogen from the hydrogen storage materials, a corresponding release of odorant from the odorant sorbent also is initiated. The released hydrogen gas and odorant vapor are mixed in a mixing tee 33 before being transmitted to outlet 35.

EXAMPLES

Example 1

Preparation of a sorbed or occluded odorant. A solution of the odoriferous material in a volatile solvent is used to fill the pores of an appropriate porous material, such as a sorption clay, zeolites, carbon, a cellulosic or polymeric sorption media. The volatile solvent is then evaporated leaving behind the adsorbed odorant. Alternatively, the odorants can also be encapsulated in an appropriate organic polymer medium. The odoriferous material solution is made at a concentration of 0.01% w/w to 90% w/w either in aqueous or non aqueous solvent/solvent mixtures of relatively high volatility solvents in which the odoriferous materials are soluble. These solvents can be both polar and nonpolar solvents such that the odoriferous material solution is capable of wetting the surface of the sorbents. The thin encapsulating layer is formed on the odorant film, for example, using a rubbery polymer such as polydimethyl siloxane amongst other rubbery materials and glassy polymers such as polyimides, polysulfones, polyamides, polyarylates, polyolefins, and the like. In some cases, to block the defects in the original coating, an over coating is then made by dissolving a rubbery or glassy film forming polymer in an appropriate volatile solvent at a concentration ranging from 0.1% to 10% solution depending on the thickness

Example 2

The odorant material can be sorbed with an appropriate substrate where it exists in a liquid condensed form and is held therein by capillary action. This odorant containing sorbed material is placed in the storage vessel in a predetermined quantity. At the temperature and pressure of the gas, the odorant material establishes equilibrium with the gas and provides the needed concentration that is required to generate an odor in the leaking gas.

Example 3

The odorant sorbed on an appropriate medium is mixed in a pre-determined ratio with the hydrogen storage material. The mixing of the two components is in a random fashion as shown in FIG. 1. When the hydrogen storage material is heated to release hydrogen, the required quantity of the odorant is released as well, thereby mixing the hydrogen gas with the non de-sorbed odorant in such a way that any leaking hydrogen from the system has a detectible specific odor associated with it.

Example 4

The odorant sorbed within an appropriate medium is placed in discrete layers along with the hydrogen storage material layers in a fashion as shown in FIG. 2 in a pre-determined ratio. When the hydrogen storage material is heated and/or the pressure is lowered to release hydrogen, it releases with it the required quantity of the odorant as well, thereby mixing the hydrogen gas with the sorbent in such a way that the leaking hydrogen has a specific odor associated with it.

Example 5

The sorbent and the hydrogen storage material are placed in separate vessels as shown in FIG. 3. Both can be maintained at the same temperature or at different temperatures to generate hydrogen and the odorant. The two are mixed in a mixing tee or the like to provide a mixture of hydrogen and odorant.

While various embodiments of the invention have been described in detail with reference to the drawings and the specific examples above, it will be apparent to one skilled in the art that various changes and modifications can be made to those embodiments, drawings, and examples without departing from the spirit and scope of the invention as defined in the claims which follow.

What is claimed is:

1. An apparatus for dispensing an odorant to a hydrogen gas, comprising:
    a container having an interior volume;
    at least one odorant material disposed in the interior volume of the container, the odorant material having at least one detectable odor; and
    at least one hydrogen storage material disposed in the interior volume of the container.

2. An apparatus as in claim 1, wherein the odorant material and the hydrogen storage material are randomly mixed in the interior volume of the container.

3. An apparatus as in claim 1, wherein at least a portion of the odorant material is in a first layer and at least a portion of the hydrogen storage material is in a second layer adjacent the first layer in the interior volume of the container.

4. An apparatus as in claim 1, wherein at least a portion of the odorant material is sorbed on a sorbent.

5. An apparatus as in claim 4, wherein a form of energy is applied to the odorant material and to the hydrogen storage material and/or the at least one container is partially depressurized, thereby releasing an amount of the hydrogen gas from the hydrogen storage material and at least a portion of the odorant material from the sorbent.

6. An apparatus as in claim 5, wherein the portion of the odorant material released is a predetermined quantity.

7. An apparatus as in claim 1, wherein the detectable odor is detectable by a sense of smell of a living being.

8. An apparatus as in claim 1, further comprising a means for transmitting the hydrogen gas from the at least one container to a storage vessel or an end user.

9. An apparatus as in claim 8, wherein the means for transmitting comprises at least one conduit in fluid communication with the at least one container.

10. An apparatus as in claim 1, wherein at least a portion of the odorant material is selected from a group consisting of derivatives of acrylic acid, alkyl esters of $C_4$ to $C_7$, carboxylic acids, and combinations thereof.

11. An apparatus as in claim 1, wherein at least a portion of the odorant material is encapsulated by a polymer selected from a group consisting of a rubbery polymer, a glassy polymer, and combinations thereof, the rubbery polymer being selected from a group consisting of polydimethyl siloxanes, polyphasphazenes, and combinations thereof, and the glassy polymer being selected from a group consisting of polyimides, polysulfones, polyamides, polyarylates, polyolefins, polyetherketones, polycarbonates, and combinations thereof.

12. An apparatus for dispensing an odorant to a hydrogen gas, comprising:
    a first container having a first interior volume;
    a second container having a second interior volume;
    at least one odorant material disposed in the first interior volume, the odorant material having at least one detectable odor;
    at least one hydrogen storage material disposed in the second interior volume;
    at least one conduit having a first end in fluid communication with the first container and a second end in fluid communication with the second container; and
    a mixing means in fluid communication with the conduit, the mixing means adapted to mix a flow of the hydrogen gas transmitted to the second end of the conduit from the second interior volume with a flow of at least a portion of the odorant material transmitted to the first end of the conduit from the first interior volume.

13. An apparatus as in claim 12, further comprising a means for transmitting a mixture of the hydrogen gas and the odorant material from the mixing means to a storage vessel or an end user.

14. An apparatus as in claim 13, wherein the means for transmitting comprises at least another conduit in fluid communication with the mixing means.

15. A method for dispensing an odorant to a hydrogen gas, comprising the steps of:
    providing at least one container, each container having an interior volume;
    providing at least one odorant material sorbed on a sorbent and disposed in the interior volume of a first container, the odorant material having at least one detectable odor;
    providing at least one hydrogen storage material disposed in the interior volume of the first container or the interior volume of a second container; and
    applying a form of energy to the odorant material and to the hydrogen storage material and/or partially depressurizing the at least one container, thereby releasing an amount of the hydrogen gas from the hydrogen storage material and at least a portion of the odorant material from the sorbent.

16. A method as in claim 15, wherein the portion of the odorant material released is a predetermined quantity.

17. A method as in claim 15, comprising the further step of transmitting the hydrogen gas from the at least one container to a storage vessel or an end user.

18. A method as in claim 15, wherein at least a portion of the odorant material is selected from a group consisting of derivatives of acrylic acid, alkyl esters of $C_4$ to $C_7$, carboxylic acids, and combinations thereof.

19. A method as in claim 15, wherein at least a portion of the odorant material is encapsulated by a polymer selected from a group consisting of a rubbery polymer, a glassy polymer, and combinations thereof, the rubbery polymer being selected from a group consisting of polydimethyl siloxanes, polyphasphazenes, and combinations thereof, and the glassy polymer being selected from a group consisting of polyimides, polysulfones, polyamides, polyarylates, polyolefins, polyetherketones, polycarbonates, and combinations thereof.

20. A method for dispensing an odorant to a hydrogen gas, comprising the steps of:
   providing a first container having a first interior volume;
   providing a second container having a second interior volume;
   providing at least one odorant material disposed in the first interior volume, the odorant material having at least one detectable odor;
   providing at least one hydrogen storage material disposed in the second interior volume;
   providing at least one conduit having a first end in fluid communication with the first container and a second end in fluid communication with the second container;
   transmitting a flow of the hydrogen gas to the second end of the conduit from the second interior volume;
   transmitting a flow of at least a portion of the odorant material to the first end of the conduit from the first interior volume;
   withdrawing from the conduit at least a portion of the hydrogen gas and at least a portion of the odorant material; and
   mixing the hydrogen gas and the odorant material withdrawn from the conduit, thereby forming a mixture of the hydrogen gas and the odorant material.

21. A method as in claim 20, comprising the further step of transmitting at least a portion of the mixture of the hydrogen gas and the odorant material to a storage vessel or an end user.

22. A method as in claim 20, wherein at least a portion of the odorant material is selected from a group consisting of derivatives of acrylic acid, alkyl esters of $C_4$ to $C_7$, carboxylic acids, and combinations thereof.

23. A method as in claim 20, wherein at least a portion of the odorant material is encapsulated by a polymer selected from a group consisting of a rubbery polymer, a glassy polymer, and combinations thereof, the rubbery polymer being selected from a group consisting of polydimethyl siloxanes, polyphasphazenes, and combinations thereof, and the glassy polymer being selected from a group consisting of polyimides, polysulfones, polyamides, polyarylates, polyolefins, polyetherketones, polycarbonates, and combinations thereof.

* * * * *